United States Patent [19]

Thissen

[11] Patent Number: 5,308,487
[45] Date of Patent: May 3, 1994

[54] DEVICE FOR SEPARATING LIQUID AND SOLID MATERIAL OUT OF A MIXTURE

[75] Inventor: Karel A. Thissen, Utrecht, Netherlands

[73] Assignee: Pannevis B.V., Utrecht, Netherlands

[21] Appl. No.: 874,072

[22] Filed: Apr. 24, 1992

[30] Foreign Application Priority Data

Apr. 29, 1991 [NL] Netherlands ............... 9100738

[51] Int. Cl.$^5$ .......................................... B01D 33/056
[52] U.S. Cl. ................................... 210/400; 210/406;
  210/416.1; 210/450; 162/365; 209/477
[58] Field of Search ............... 162/297, 310, 363, 365,
  162/367; 209/307, 470, 477; 210/400, 401, 406,
  416.1, 450

[56] References Cited

U.S. PATENT DOCUMENTS

| | | | |
|---|---|---|---|
| 2,608,913 | 9/1952 | Bratton | 162/365 |
| 2,720,142 | 10/1955 | Magnani | 162/365 |
| 2,997,179 | 8/1961 | DeGooijer | |
| 4,038,193 | 7/1977 | van Oosten | 210/400 |
| 4,186,090 | 1/1980 | van Oosten | 210/400 |
| 5,089,143 | 2/1992 | Anderson | 210/401 |

FOREIGN PATENT DOCUMENTS 105812 3/1963 Netherlands .
7210541 2/1974 Netherlands .

Primary Examiner—Matthew O. Savage
Attorney, Agent, or Firm—Webb, Burden, Zeisenheim & Webb

[57] ABSTRACT

A device for separating liquid and solid material from a mixture consists of an endless filter belt, beneath which is arranged a suction box connected to a vacuum device. The suction box supports the filter belt. The filter belt moves continuously while the suction box performs a reciprocating movement in the direction of the filter belt. In order to make possible the reciprocating movement of the suction box the connection of the suction box to the stationary vacuum device is embodied as a telescopic connection consisting of a stationary part connected to the vacuum device and a part connected to the suction box and slidably movable in the stationary part.

16 Claims, 3 Drawing Sheets

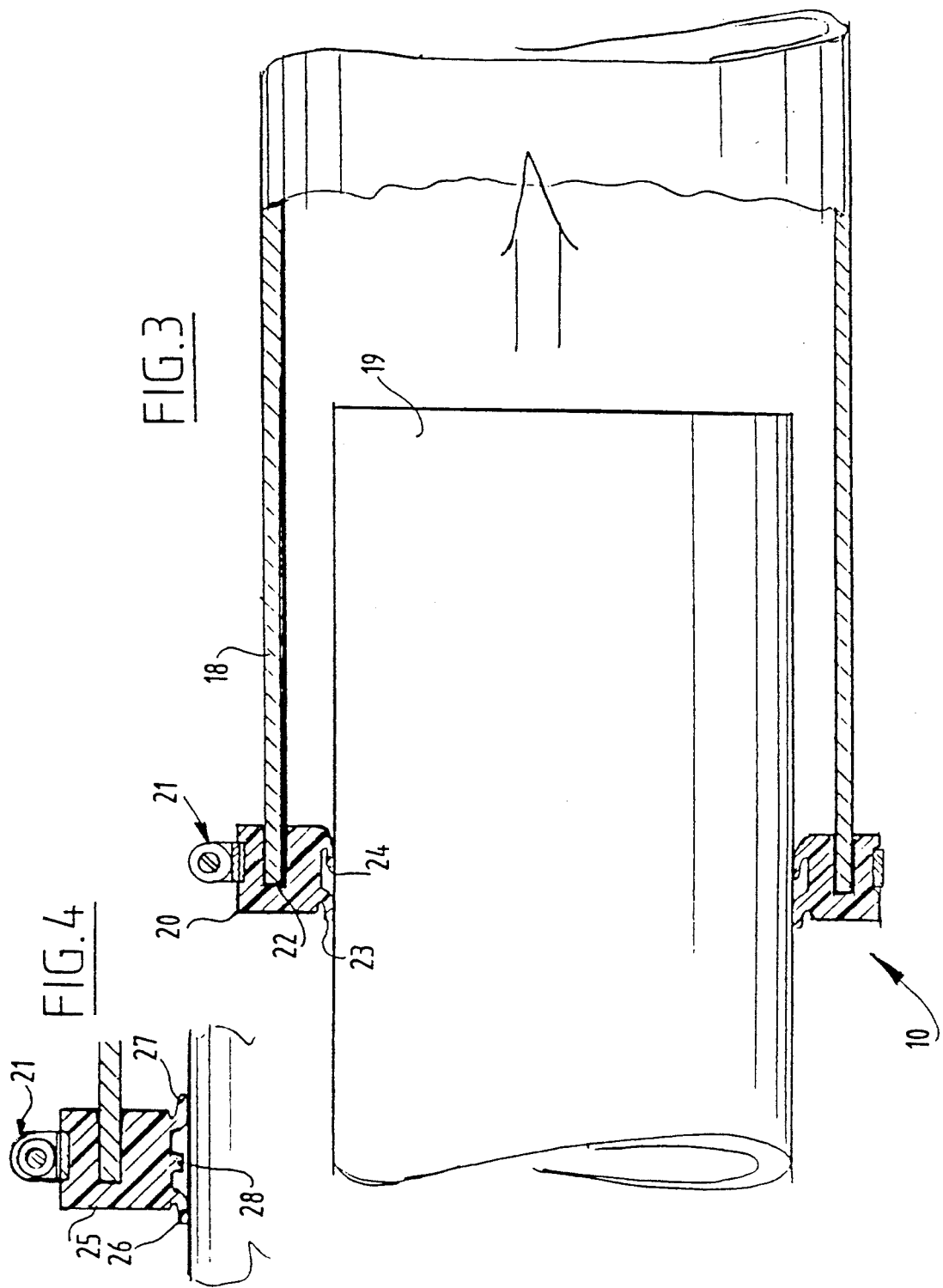

DEVICE FOR SEPARATING LIQUID AND SOLID MATERIAL OUT OF A MIXTURE

BACKGROUND OF THE INVENTION

The invention relates to a device for separating and solid material from a mixture, provided with an endless filter belt, means for supplying the mixture for separating on the upper side of the filter belt, at least one suction box located on the underside, supporting the filter belt and reciprocally movable in lengthwise direction of the filter belt and connected to a vacuum device.

Such a device is known inter alia from the Netherlands patent 105.812 and the published patent application 72.10541.

In a known device the connection between the suction box and the vacuum device is flexible, for instance a hose. This flexible arrangement is necessary to enable the connection between the moving suction box and the stationary vacuum device. Such a connection of flexible material has drawbacks. With high temperatures and processing of aggressive substances the useful life of the flexible connection is limited. The material of the flexible connection further imposes limitations on the height of the applied temperature, the processing of particular substances and the volumes for throughput. The invention has for its object to bring improvements herein.

SUMMARY OF THE INVENTION

This is achieved according to the invention in that the suction box is connected to the vacuum device over a telescopic connection system.

Use of a non-flexible connection enables use of material, for instance stainless steel, that is resistant to high temperatures and aggressive substances.

The processing capacity of the device can in this way be enlarged.

The telescopic connection can be formed by a stationary cylindrical part connected to the vacuum device and a part connected to the suction box and slidably movable in the stationary part.

Arranged on the end of the stationary part oriented towards the movable part is an annular seal.

The annular seal has at least one lip directed towards the movable part. When pressure decrease occurs by means of the vacuum device the lips seal against the movable part of the telescopic connection in operationally reliable manner. The seal is of a suitable material, for instance elastomer or a thermoplast. The seal can be fixed by means of a clamp.

BRIEF DESCRIPTION OF THE DRAWINGS

The invention is further elucidated with reference to the drawings of an embodiment.

In the drawings:

FIG. 3 shows a detail according to arrow III in FIG. 1, and

FIG. 4 shows a second embodiment of the seal of the telescopic connection.

DESCRIPTION OF THE PREFERRED EMBODIMENT

Figure 1:
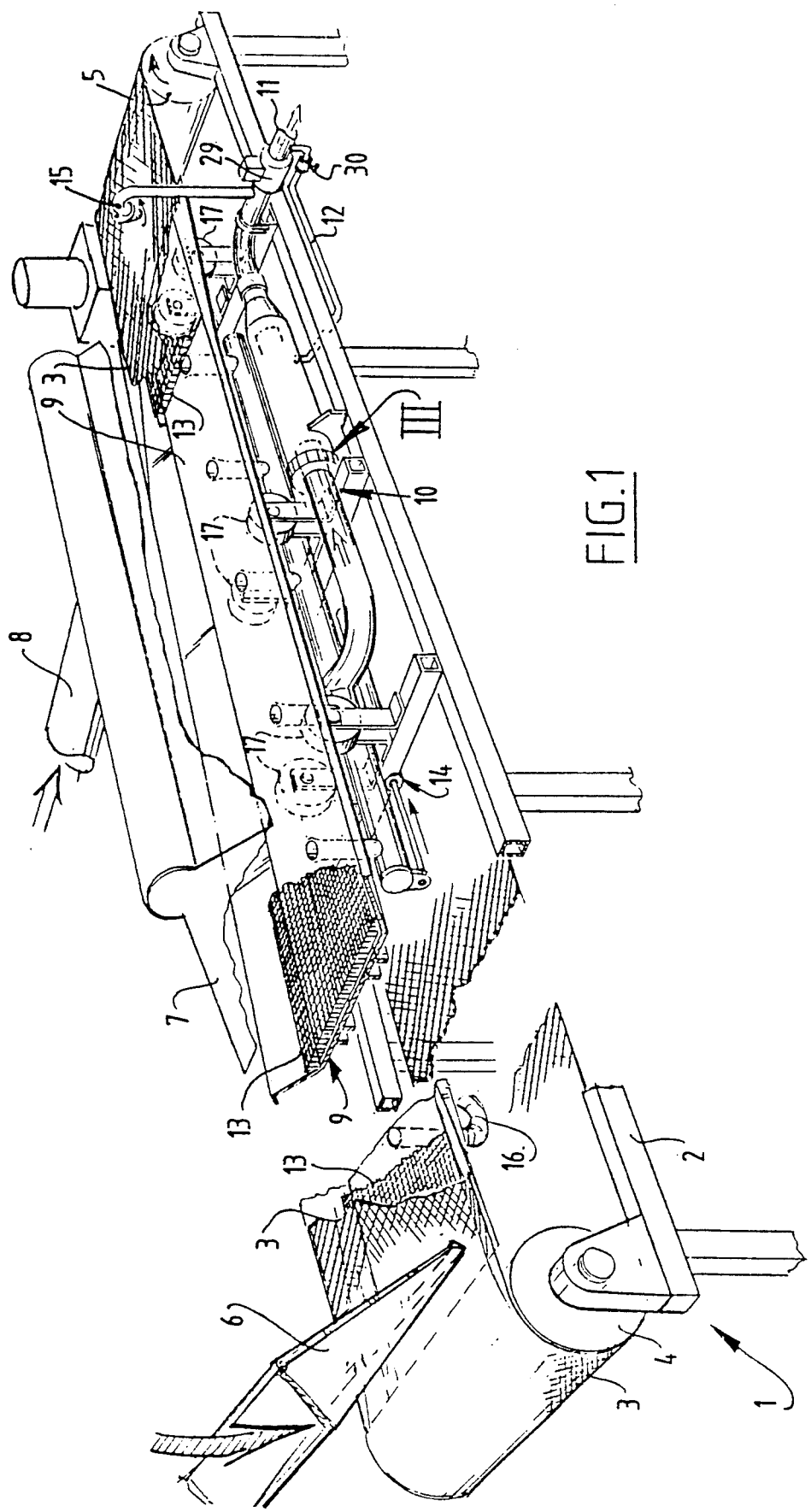
FIG. 1 shows a perspective view of a device according to the invention.
Figure 2:
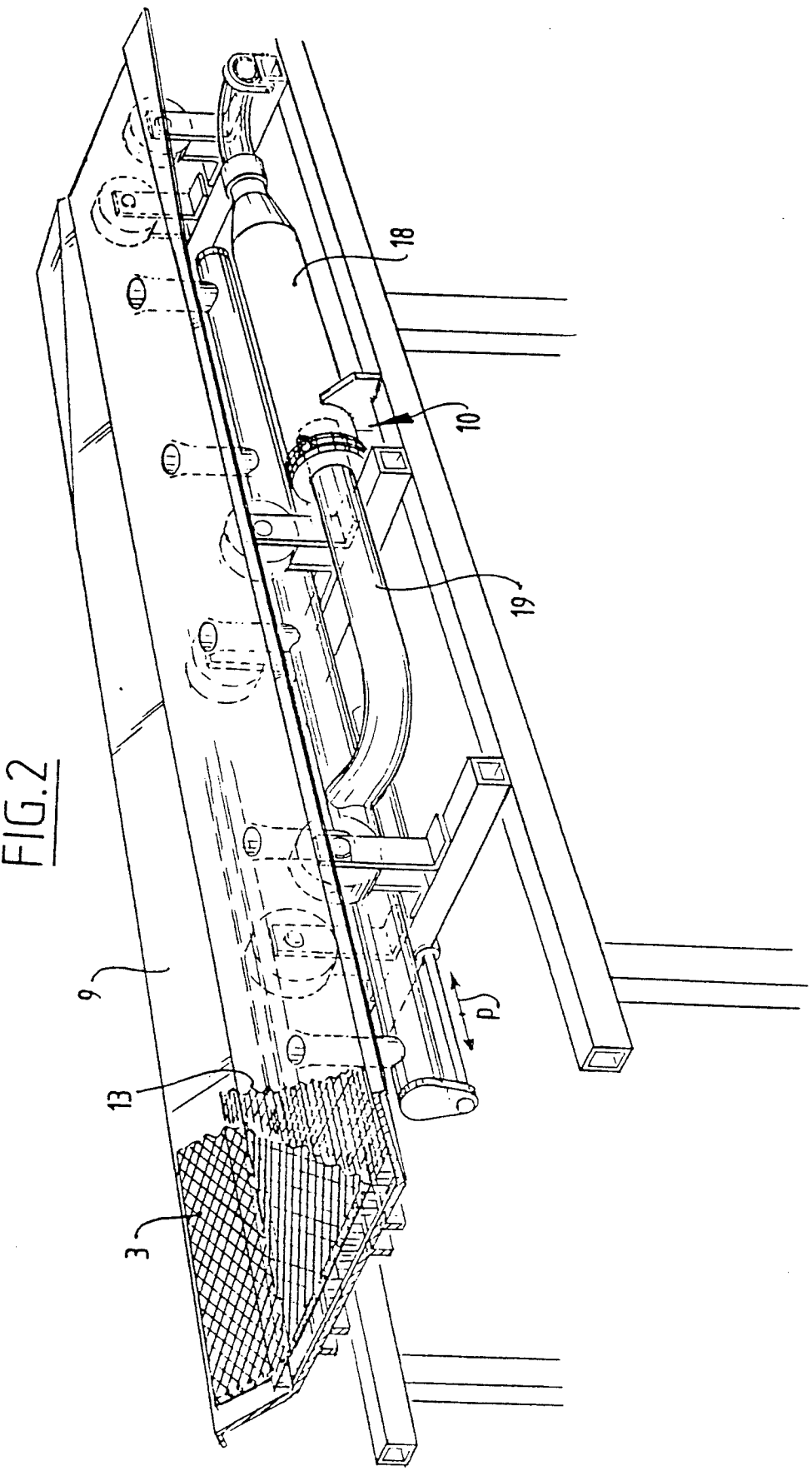
FIG. 2 shows a part of the device of FIG. 1 on a larger scale.

The device 1 has a frame 2 shown fragmentedly and constructed from vertical and horizontal beams, in which an endless belt 3 is movable over rollers 4 and 5 in the direction of the arrow. The belt is a filter belt that is permeable to liquids. A feed device 6 is placed above the belt for feeding the mixture for separating Further placed above the belt is a supply cover 7 for supplying heating air via the connecting piece 8. Placed under the belt in known manner is a suction box 9 which is connected via a transmission 10 to a vacuum connection 11. The latter, which is provided with a closing valve 29, is connected to a vacuum device (not drawn). The suction box has on the top side a grid 13. When vacuum is generated the filter belt 3 is pulled against the grid 13. The suction box is reciprocally movable in lengthwise direction of filter belt 3 according to arrow P (FIG. 2). The suction box is driven by the piston 14 which also determines the stroke of the suction box. Connected to the vacuum connection 11 is an air valve 15 which is closed when there is vacuum in the suction box. Another connection 16 is further arranged under the belt which is connected to a vacuum device (not shown) This connection 16 serves to drain the filtrate. The suction box is guided in its movement by rollers, for instance 17.

At the beginning of the suction cycle when the piston 14 is extended over its full stroke length, the closing valve 29 is opened and an underpressure is generated in suction box 9 by the vacuum device. The underpressure is maintained until the end of the vacuum stroke defined by the piston 14 is reached. The closing valve 29 is then closed and air is again admitted by the air valve 15 into the suction box 9 during the return stroke thereof.

In order to drain liquid left behind in the connection when the closing valve 29 is closed, the connection 10 can be continuously connected to the vacuum device over a bypass conduit 12. A very small underpressure is thus also maintained in the suction box during the return stroke. To control this underpressure the bypass conduit 12 is provided with an adjustable throttle valve 30.

When it is desired to separate different liquids or different concentrations thereof from a mixture, multiple suction boxes 9 can be placed in series underneath the belt 3.

According to the invention the connection 10 is a telescopic connection constructed from a stationary part connected to the vacuum connection 11 and a part 19 movable slidably therein connected to the suction box. The parts 18 and 19 may be of metal, for instance stainless steel, that is resistant to high temperatures and aggressive substances.

The seal between the parts 18 and 19 is obtained by means of a sealing ring 20 connected by means of a clamp 21 to the stationary part 18 at the end 22 thereof. The sealing ring 20 has one or two lips 23, 24 oriented towards the movable part. When underpressure occurs in the stationary part as a result of the action of the vacuum device, the lips 23, 24 will hereby be pulled sealingly against the movable part 19 in operationally reliable manner.

In FIG. 4 the sealing ring 25 has a slightly different form, in the sense that an intermediate rib 28 is arranged in addition to both lips 26, 27. The rib 28 prevents too great a load when switching from underpressure to normal pressure. Because it is possible to apply high drying temperatures, the standing time is shortened. It is further possible to employ the device for separating mixtures which incorporate aggressive substances

We claim:

1. A device for separating liquid and solid material from a mixture comprising:
   (a) an endless filter belt,
   (b) means for supplying the mixture for separation on an upper side of said filter belt,
   (c) at least one suction box located on an underside of said filter belt,
   wherein said at least one suction box supports said filter belt and is reciprocally movable in a lengthwise direction of said filter belt and is connected to a vacuum device, and
   wherein said at least one suction box is connected to said vacuum device over a telescopic connection system wherein said at least one suction box is movable in a first lengthwise direction and in a second lengthwise direction over said filter belt and in relation to a stationary part of said telescopic connection system, and with a vacuum source connected to said at least one suction box through said stationary part.

2. The device as claimed in claim 1, further including an annular seal arranged on an end of the stationary part directed towards said part slidably movable therein.

3. The device as claimed in claim 2, wherein said annular seal has at lest two lips directed towards said part slidably movable therein.

4. The device as claimed in claim 2, wherein the seal is of rubber.

5. The device as claimed in claim 2, wherein the seal is of teflon.

6. The device as claimed in claim 2, wherein the seal is fixed to the stationary part by means of a clamp.

7. A device for separating liquid and solid material from a mixture comprising:
   (a) an endless filter belt,
   (b) means for supplying the mixture for separation on an upper side of said filter belt,
   (c) at lest one suction box located on an underside of said filter belt,
   (b) means for supplying the mixture for separation on an upper side of said filter belt,
   (c) at least one suction box located on an underside of said filter belt,
   wherein said at least one suction box supports said filter belt and is reciprocally movable in a lengthwise direction of said filter belt and is connected to a vacuum device, and
   wherein said at lest one suction box is connected to said vacuum device over a telescopic connection system wherein said at least one suction box is movable in a first lengthwise direction and in a second lengthwise direction over said filter belt and in relation to a stationary part of said telescopic connection system, and with a vacuum source connected to said at least one suction box through said stationary part.

8. The device as claimed in claim 7, further including an annular seal arranged on the end of the stationary part directed towards said part slidably movable therein.

9. The device as claimed in claim 8, wherein the seal is of rubber.

10. The device is claimed in claim 8, wherein the seal is of teflon.

11. The device as claimed in claim 8, wherein the seal is fixed to the stationary part by means of a clamp.

12. The device as claimed in claim 8, wherein the annular seal has at least two lips directed towards said part slidably movable therein.

13. The device as claimed in claim 12, wherein the seal is of rubber.

14. The device as claimed in claim 12, wherein the seal is of teflon.

15. The device as claimed in claim 12, wherein the seal is fixed to the stationary part by means of a clamp.

16. The device as claimed in claim 7, wherein the telescopic connection system is constructed from stainless steel.

* * * * *

UNITED STATES PATENT AND TRADEMARK OFFICE
CERTIFICATE OF CORRECTION

PATENT NO. : 5,308,487
DATED : May 3, 1994
INVENTOR(S) : Karel A. Thissen

Page 1 of 2

It is certified that error appears in the above-indentified patent and that said Letters Patent is hereby corrected as shown below:

Column 1 Line 6 after "separating" insert --liquid--.

Column 2 Line 4 after "separating" insert --.--.

Column 2 Line 21 after "shown)" insert --.--.

Column 2 Line 33 after "connection" insert --10--.

Column 2 Line 46 after "part" (first occurrence) insert --18--.

Column 2 Line 67 after "substances" insert --.--.

Claim 3 Line 25 Column 3 "lest" should read --least--.

Claim 7 Lines 37-40 Column 3 delete first occurrences of sections "(b)" and "(c)" of claim 7.

Claim 7 Line 9 Column 4 "lest" should read --least--.

UNITED STATES PATENT AND TRADEMARK OFFICE
CERTIFICATE OF CORRECTION

PATENT NO. : 5,308,487
DATED : May 3, 1994
INVENTOR(S) : Karel A. Thissen

It is certified that error appears in the above-indentified patent and that said Letters Patent is hereby corrected as shown below:

Claim 7 Lines 11-17 Column 4 after "system" delete rest of paragraph, beginning with "wherein" and ending with "stationary part", and insert --formed by a stationary cylindrical part connected to said vacuum device and a part connected to said at least one suction box and slidably movable in said stationary part--.

Signed and Sealed this

Sixteenth Day of August, 1994

BRUCE LEHMAN

Attest:

Attesting Officer

Commissioner of Patents and Trademarks